US005805123A

United States Patent [19]

Satoh et al.

[11] Patent Number: 5,805,123

[45] Date of Patent: Sep. 8, 1998

[54] DISPLAY PANEL DRIVING CIRCUIT HAVING AN INTEGRATED CIRCUIT PORTION AND A HIGH POWER PORTION ATTACHED TO THE INTEGRATED CIRCUIT

[75] Inventors: Toshimi Satoh, Kawasaki; Tohru Hongoh, Yamato; Toshiyuki Ouchi, Yokohama, all of Japan

[73] Assignee: Texas Instruments Incorporated, Dallas, Tex.

[21] Appl. No.: 617,158

[22] Filed: Mar. 18, 1996

[30] Foreign Application Priority Data

Mar. 16, 1995 [JP] Japan .................................... 7-057696

[51] Int. Cl.[6] ........................................................ G02F 1/93

[52] U.S. Cl. ................................................................ 345/60

[58] Field of Search ................................ 345/60, 62, 200, 345/204–205, 215; 315/111.21, 111.01

[56] References Cited

U.S. PATENT DOCUMENTS

| | | |
|---|---|---|
| 4,280,079 | 7/1981 | Nishida . |
| 4,384,287 | 5/1983 | Sakuma . |
| 4,555,641 | 11/1985 | Hada et al. . |
| 4,665,345 | 5/1987 | Shionoya et al. . |
| 4,692,665 | 9/1987 | Sakuma . |
| 5,088,098 | 2/1992 | Lee . |
| 5,596,295 | 1/1997 | Ueno et al. . |

*Primary Examiner*—Mark R. Powell
*Attorney, Agent, or Firm*—William B. Kempler; Richard L. Donaldson

[57] ABSTRACT

A display panel driving circuit in which a substantial portion of the power dissipation is in the portion of the circuit located off of the integrated circuit. A level shift circuit converts a high level of a signal S2 to a low level, converts a low level of the signal S2 to a high voltage VH level, and outputs a signal S2'. A transistor XSC connects output an terminal HVO1 to ground when signal S2 is at the high level. A transistor XSU is maintained in a nonconductive state when the output of the level shift circuit is low level and connects an output terminal HVO1 to an external signal input terminal VSU when the level shift circuit is at the high voltage VH level. A transistor XSD connects output terminal HVO1 to an external signal input terminal VSD when a signal S3 is at the low level and a signal S3' is at the high level; XSD is maintained in the nonconductive state when signal S3' is at the low level.

6 Claims, 8 Drawing Sheets

FIG. 2
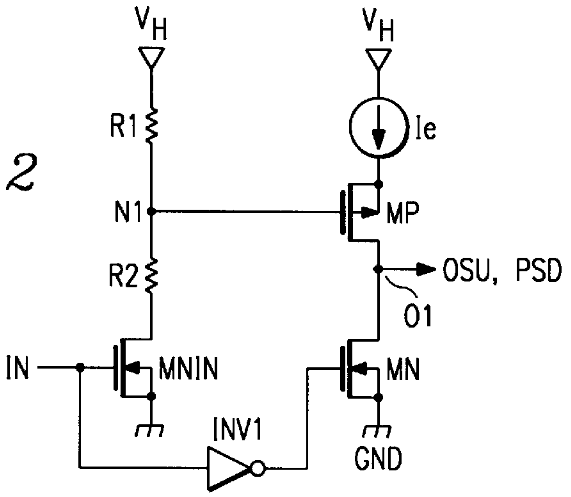
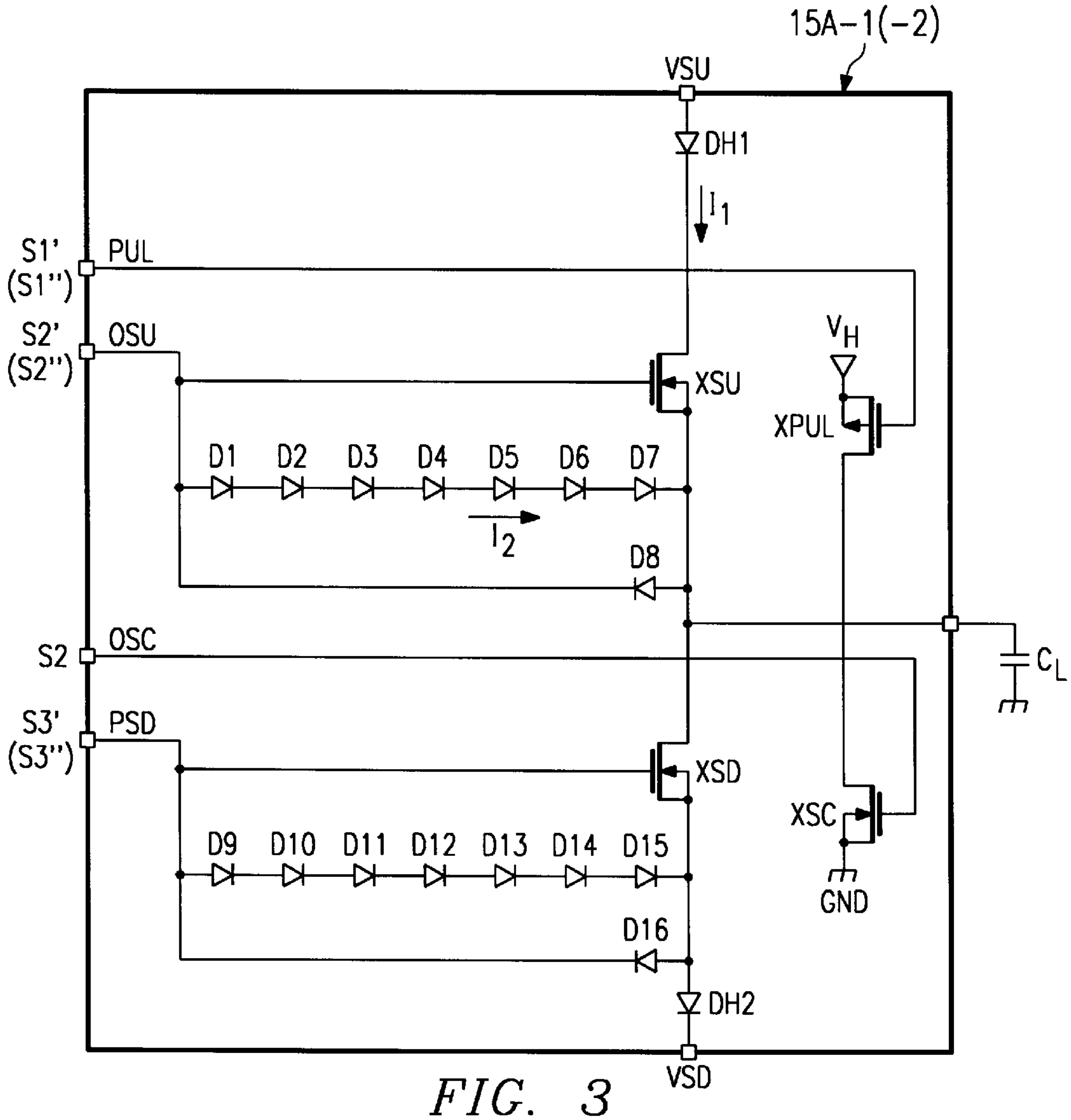
FIG. 3

FIG. 8
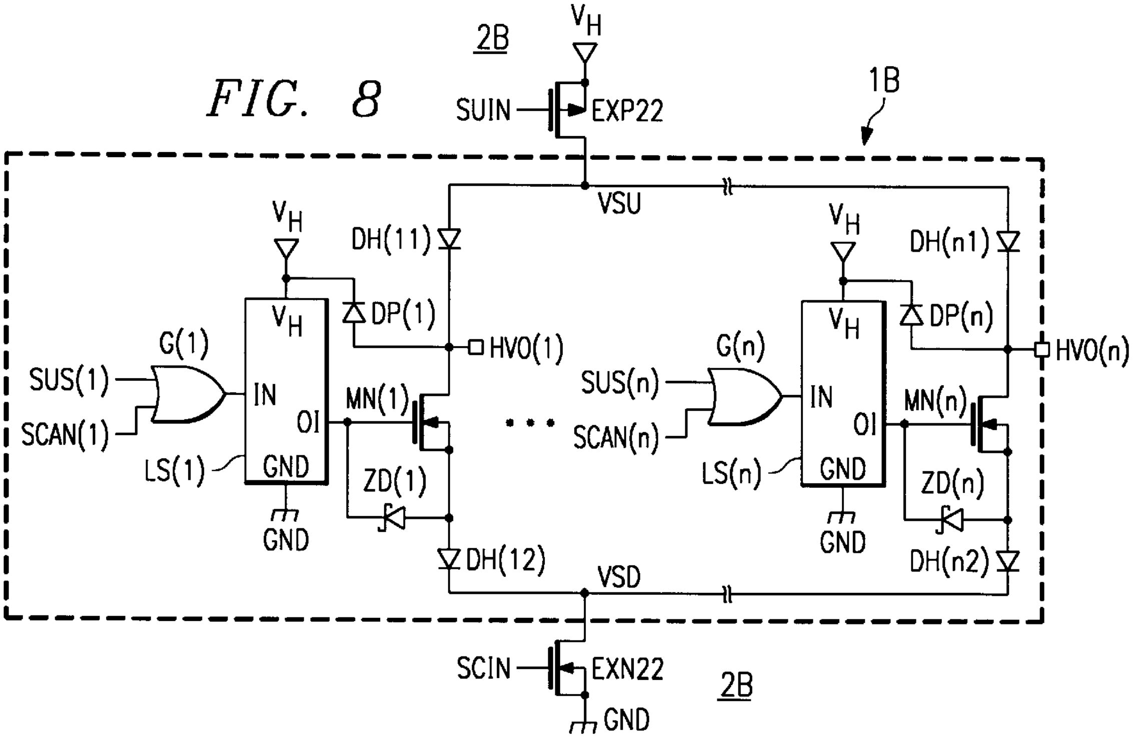
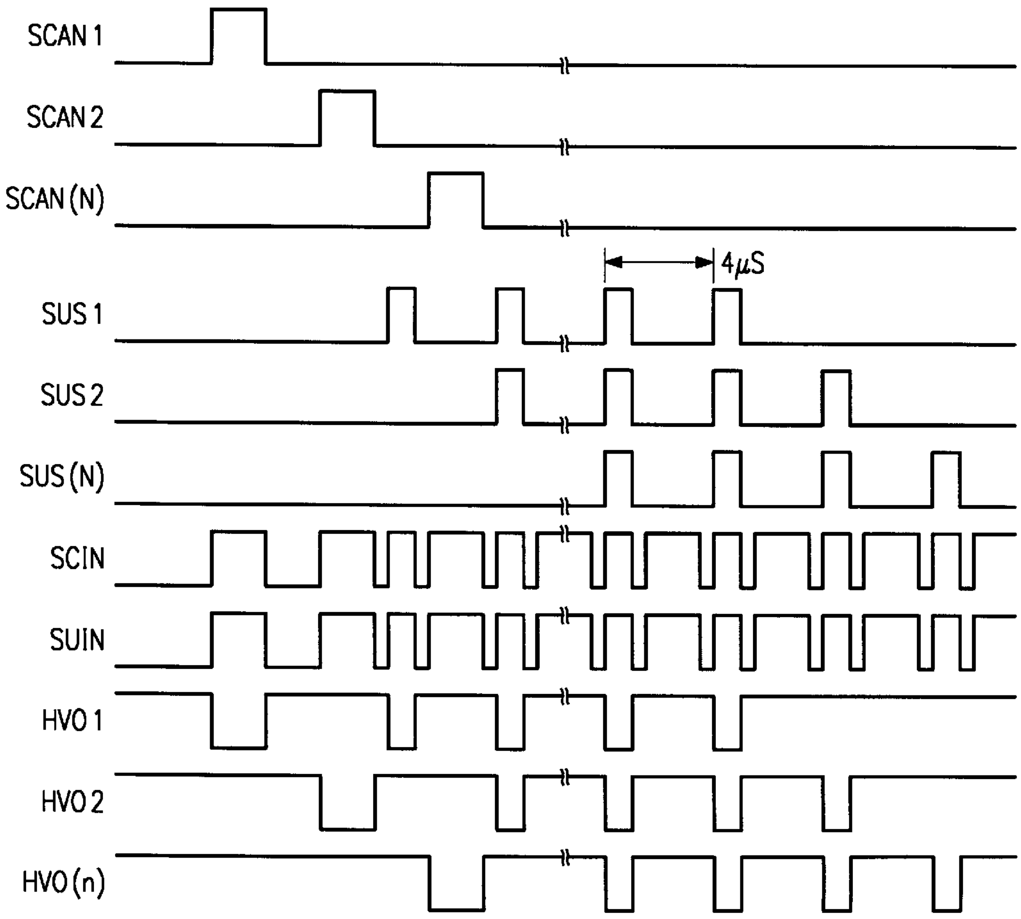
FIG. 9

DISPLAY PANEL DRIVING CIRCUIT HAVING AN INTEGRATED CIRCUIT PORTION AND A HIGH POWER PORTION ATTACHED TO THE INTEGRATED CIRCUIT

FIELD OF THE INVENTION

This invention relates to display driving circuits, and more particularly to a driving circuit for a plasma panel display.

BACKGROUND OF THE INVENTION

The operation of a plasma display is carried out utilizing a plasma discharge, but the driving is carried out by supplying an anode or supplementary anode voltage and cathode voltage at a prescribed level with respect to a group of cells arranged in a matrix.

When initiating discharge during the driving, for example, 60 V is supplied as the anode voltage and −280 V is supplied as the cathode voltage for a prescribed time T1. After discharge is executed once, a discharge-sustaining voltage less than the first discharge starting voltage, specifically the cathode voltage, is thereafter supplied for the discharge at prescribed times, for example, at 4 μsec intervals.

FIG. 12 shows a conventional example of a DC-type cathode electrode driving circuit 1 for a DC-type plasma display panel. This circuit 1 has discrete ICs and has input buffer circuits B1–B8, shift register circuits SRF 11a-1, 11a-2, . . . , 11b-1, 11b-2, . . . , latch circuits LTC 12a-1, 12a-2, . . . , 12b-1, 12b-2, . . . , gate circuits 13-1 and 13-2, level shift circuits L/S 14-1), 14-2, . . . , buffer circuits BP1, BP2, . . . , BN1, BN2, . . . , and serially connected PMOS transistors PT1, PT2, . . . and NMOS transistors NT1, NT2, . . .

Also, HVO1 and HVO2 in FIG. 12 indicate the output terminals, GND the ground potential, $V_{DD}$ the supply voltage, and VH the supply high voltage.

The input of input buffer circuit B1 is coupled to the input terminal of data signal D1 and the output is coupled to input terminal IN of shift register circuit 11a-1. Output terminal OUT of shift register circuit 11a-1 is coupled to input terminal IN of shift register circuit 11a-2.

The input of input buffer circuit B2 is coupled to the input terminal of clock signal CKD1 and the output is coupled to clock input terminal CK of shift register circuits 11a-1, 11a-2, . . .

The input of input buffer circuit B3 is coupled to the input terminal of data signal D2 and the output is coupled to input terminal IN of shift register circuit 11b-i. Output terminal OUT of shift register circuit 11b-1 is coupled to input terminal IN of shift register circuit 11b-2.

The input of input buffer circuit B4 is coupled to the input terminal of clock signal CKD2 and the output is coupled to clock input terminal CK of shift register circuits 11b-1, 11b-2, . . . . The outputs of shift register circuits 11a-i, 11b-i, 11a-2, and 11b-2 are connected to the inputs of latch circuits 12a-1, 12b-1, 12a-2, and 12b-2.

The input of input buffer circuit B5 is coupled to the input terminal of signal LED1 and the output is coupled to control terminal LE of latch circuits 12a-1 and 12a-2. The input of input buffer circuit B6 is coupled to the input terminal of signal LED2 and the output is coupled to control terminal LE of latch circuits 12b-1 and 12b-2.

The input of input buffer B7 is coupled to the input terminal of signal T1 and the output is coupled to one input of two-input AND circuit 131 in gate circuit 13-1 and one input of two-input AND circuit 131 in gate circuit 13-2.

The input of input buffer B8 is coupled to the input terminal of signal T2 and the output is coupled to one input of two-input AND circuit 132 in gate circuit 13-1 and one input of two-input AND circuit 132 in gate circuit 13-2.

The other input of two-input AND circuit 131 in gate circuit 13-1 is coupled to the output of latch circuit 12a-1 and the other input of two-input AND circuit 132 is coupled to the output of latch circuit 12b-1.

The output of AND circuits 131 and 132 is coupled to the input of two-input OR circuit 133 and the output of OR circuit 133 is coupled to input terminal IN of level shift circuit 14-1. The other input of two-input AND circuit 131 in gate circuit is coupled to the output of latch circuit 12a-2 and the other input of two-input AND circuit 132 is coupled to the output of latch circuit 12b-2. The output of AND circuits 131 and 132 is coupled to the input of two-input OR circuit 133) and the output of OR circuit 133 is coupled to input terminal IN of level shift circuit 14-2.

Level shift circuits 14-1 and 14-2 have two output terminals O1 and O2 and output high-level signals approximately equal to the power source voltage of buffer circuits BP1 and BN1 from output terminals O1 and O2 when a high-level signal is input to input terminal IN.

Output terminal O1 of level shift circuit 14-1 is coupled to the gate of PMOS transistor PT1 via buffer circuit BP1 and output terminal O2 is coupled to the gate of NMOS transistor NT1 via buffer circuit BN1.

Similarly, output terminal O1 of level shift circuit 14-2 is coupled to the gate of PMOS transistor PT2 via buffer circuit BP2 and output terminal O2 is coupled to the gate of NMOS transistor NT2 via buffer circuit BN2.

As noted above, the display panel driving circuit according to the conventional driver IC has driving circuits PT and NT, buffer circuits BP and BN, level shift circuit 14, gate circuit 13, two latch circuits 12a and 12b, and two shift register circuits 11a and 11b with respect to one output terminal HVO.

FIG. 13 is a timing chart showing the relationship between the level of output terminals HVO1 and HVO2 and each input driving signal in the circuit of FIG. 12.

The operation of the circuit in FIG. 12 will be explained with reference to FIG. 13. This circuit drives one driving circuit with two data signals D1 and D2 with different timing. Data signal D1 and data signal D2 are data for determining which output terminal HVO is to be placed in the on state (ground level) and are serial/parallel converted in shift register circuits 11a and 11b and latch circuits 12a and 12b.

Namely, these data are transmitted according to clock signals CKD1 and CKD2 to shift register circuits 11a and 11b then respectively maintained in latch circuits 12a and 12b based on the input of signals LED1 and LED2.

Then, logic output is obtained in gate circuit 13 when signals T1 and T2 go to the high level, the voltage supplied to the gates of PMOS transistor PT and NMOS transistor NT in the driving circuit is controlled according to the state of data signals D1 and D2 via level shift circuit 14, and a prescribed pulse signal is output to output terminal HVO.

In the case of the circuit in FIG. 12, the pulse signals output to output terminals HVO1 and HVO2 comply with a fixed phase difference PHD, namely, cycle of signals T1 and T2 as shown in FIG. 13.

Generally, the waveform output based on signal T1 is called the scanning pulse and the waveform output based on signal T2 is called the sustaining pulse.

However, in the conventional circuit, there is a problem in that the power consumption is high, as indicated below, and the fabrication of an IC is difficult.

For example, power consumption PCL with respect to capacitive load at a frequency f and load capacitance CL can be obtained with the following equation with regard to the circuit in FIG. 12.

$$P_{CL}=f\times C_L\times V^2 \tag{1}$$

In this case, with a frequency f of 250 kHz, load capacitance $C_L$ of 120 pF, voltage of 100 V, and one IC with 32 output terminals HVO of HVO1–HVO32, the following value is obtained from the equation (1).

$$\begin{aligned} P_{CL32} &= 250K \times 120p \times 100^2 \times 32 \\ &= 9.6\ (W) \end{aligned} \tag{2}$$

This value makes the realization of an IC difficult, since the power consumption of the driver IC has a limit of about 2 W according to restrictions of the package, etc.

My invention was made taking the situation into consideration and the objective is to provide a display panel driving circuit in which a reduction in the power consumption in an integrated circuit (IC) and the IC can be realized.

SUMMARY OF INVENTION

To achieve this objective, the display panel driving circuit of my invention has a first and second shift register groups, first, second, and third transistor groups, and first and second transistors. The first shift register group has a number of shift registers that successively shift a first pulse signal according to the first clock signal. The second shift register group has a number of shift registers that successively shift a second pulse signal according to a second clock signal. The first transistor group has a number of transistors that couple each output terminal of an output terminal group respectively to a first reference potential based on the output of each shift register in the first shift register group.

The second transistor group has a number of transistors that couple each output terminal of the output terminal group respectively to a first terminal by operating in a complementary manner with respect to each transistor in the first transistor group. The third transistor group has a number of transistors that couple each output terminal of the output terminal group respectively to a second terminal based on the output of each shift register in the second shift register group. The first transistor couples the second terminal to the first reference potential according to a third pulse signal, and a second transistor that couples the first terminal to a second reference potential by operating in a complementary manner with respect to the first transistor.

The display panel driving circuit of my invention has a fourth transistor group with a number of transistors that couple each output terminal of the output terminal group respectively to the second reference potential at least when each transistor of the third transistor group and each transistor of the first transistor group are in the nonconductive state.

Also in the display panel driving circuit of the invention, each output terminal of the output terminal group is coupled respectively to each cathode electrode of the plasma display panel, a scanning pulse with a prescribed phase difference is applied to each of the cathode electrodes according to the conduction of each transistor in the first transistor group, and a sustaining pulse with a prescribed phase difference is applied respectively to each of the cathode electrodes with the conduction of the second transistor.

Furthermore, in the display panel driving circuit of the invention, the first shift register group, second shift register group, first transistor group, second transistor group, third transistor group, and fourth transistor group are formed in the same semiconductor integrated circuit device.

Also, the display panel driving circuit of the invention has a transistor group with a number of transistors that couple each output terminal of the output terminal group respectively to the second terminal based on the input of the first pulse signal, a second transistor that couples the second terminal to the first reference potential according to the second pulse signal, and a second transistor that couples the first terminal to the second reference potential by operating in a complementary manner with respect to the first transistor, and when the transistors in the transistor group are in the conductive state, the first transistor is maintained in the conductive state, and when the transistors in the pertinent transistor group are in the nonconductive state, the second transistor is maintained in the conductive state.

Also, the display panel driving circuit of the invention has a rectifying element connected respectively between each output terminal of the output terminal group and the first terminal so as to be in the forward direction from the pertinent first terminal toward each output terminal.

According to the display panel driving circuit of the invention, the transistor corresponding to each of the output terminals in the first transistor group conducts and outputs the first reference potential (ground potential) to the output terminal when outputting the first drive pulse to each output terminal of the output terminal group. At this time, the transistor corresponding to each of the output terminals in the second transistor group is in the nonconductive state.

On the other hand, when outputting the second drive pulse to the output terminals of the output terminal group, the first transistor conducts when the transistor corresponding to each of the output terminals in the third transistor group is in the conductive state and outputs the first reference potential to the output terminal.

The transistors in the second transistor group conduct, when the corresponding transistors in the first transistor group, are in the conductive state and respectively output the second reference potential (supply voltage) to the output terminals of the output terminal group according to the conduction of the second transistor.

The transistors of the fourth transistor group respectively output the second reference potential to the output terminals of the output terminal group when neither the first drive pulse nor the second drive pulse is output to the output terminals of the output terminal group. Namely, when the second transistor, the transistors of the third transistor group, and the transistors of the first transistor group corresponding to each output terminal of the output terminal group are in the nonconductive state, the output terminal is prevented from taking on the floating state.

The first drive pulse is a scanning pulse applied to the cathode electrode of a DC-type plasma display and the second drive pulse is a sustaining pulse. These drive pulses are applied respectively to the cathode electrode with a phase difference.

By having the first transistor and second transistor take the burden for the major portion of the drive power of the display panel driving circuit, the remainder of the circuit elements can be composed with semiconductor integrated circuit device IC allowing the mounting area of the display panel driving circuit to be small.

Also, the display panel driving circuit of the invention is controlled so that the first pulse signal is input directly or the signal that is level shifted by level shift circuit, etc., is input to the transistor of the transistor group so that the first transistor takes on the conductive state according to the second pulse signal when the transistor takes on the conductive state. Therefore, the second transistor is maintained in the nonconductive state at this time. As a result, the first reference potential is output to the output terminal connected to the transistor which is in the conductive state.

On the contrary, when the transistor of the transistor group enters the nonconductive state based on the first pulse signal, control is executed so that the second transistor enters the conductive state according to the second pulse signal. Therefore, the first transistor is maintained in the nonconductive state at this time. As a result, the second reference potential is output to the output terminal connected to the transistor which is in the conductive state.

Also, by providing a rectifying element connected respectively between each output terminal of the output terminal group and the first terminal to be in the forward direction from the first terminal toward the output terminals, it is possible to place the output terminals in the selective write or sustain state.

BRIEF DESCRIPTION OF THE DRAWINGS

FIG. 2 shows an embodiment of a level shift circuit which converts an input signal of a logical level (GND-$V_{DD}$) into a signal of full amplification (GND-$V_H$).

FIG. 3 shows an embodiment of an output circuit according to my invention.

FIG. 8 shows a second embodiment of a display panel driving circuit according to my invention.

FIG. 9 is a timing chart showing the relationship between the level of output terminal HVO (n) and each of input driving signals SCAN (n), SUS (n), SUIN, and SCIN in the circuit of FIG. 8.

In the figures, 1A and 1B are 1C parts, B1–B8 input buffer circuits, 11*a*-1, 11*a*-2, 11*b*-1 and 11*b*-2 shift register circuits, 12*a*-1, 12*a*-2, 12*b*-1 and 12*b*-2 latch circuits, 13A-1 and 13A-2 gate circuits, 14A-11-14A-13, 14A-21-14A-23, 14B and 14C level shift circuits, 15A-1, 15A-2 and 15B output circuits, HVO1 and HVO2 output terminals, 2A and 2B discrete parts, 21 level shift circuit, BP21 and BN21 buffer circuits, EXP21 and EXP22PMOS transistors, and EXN21 and EXN22 NMOS transistors.

DETAILED DESCRIPTION

Figure 1:
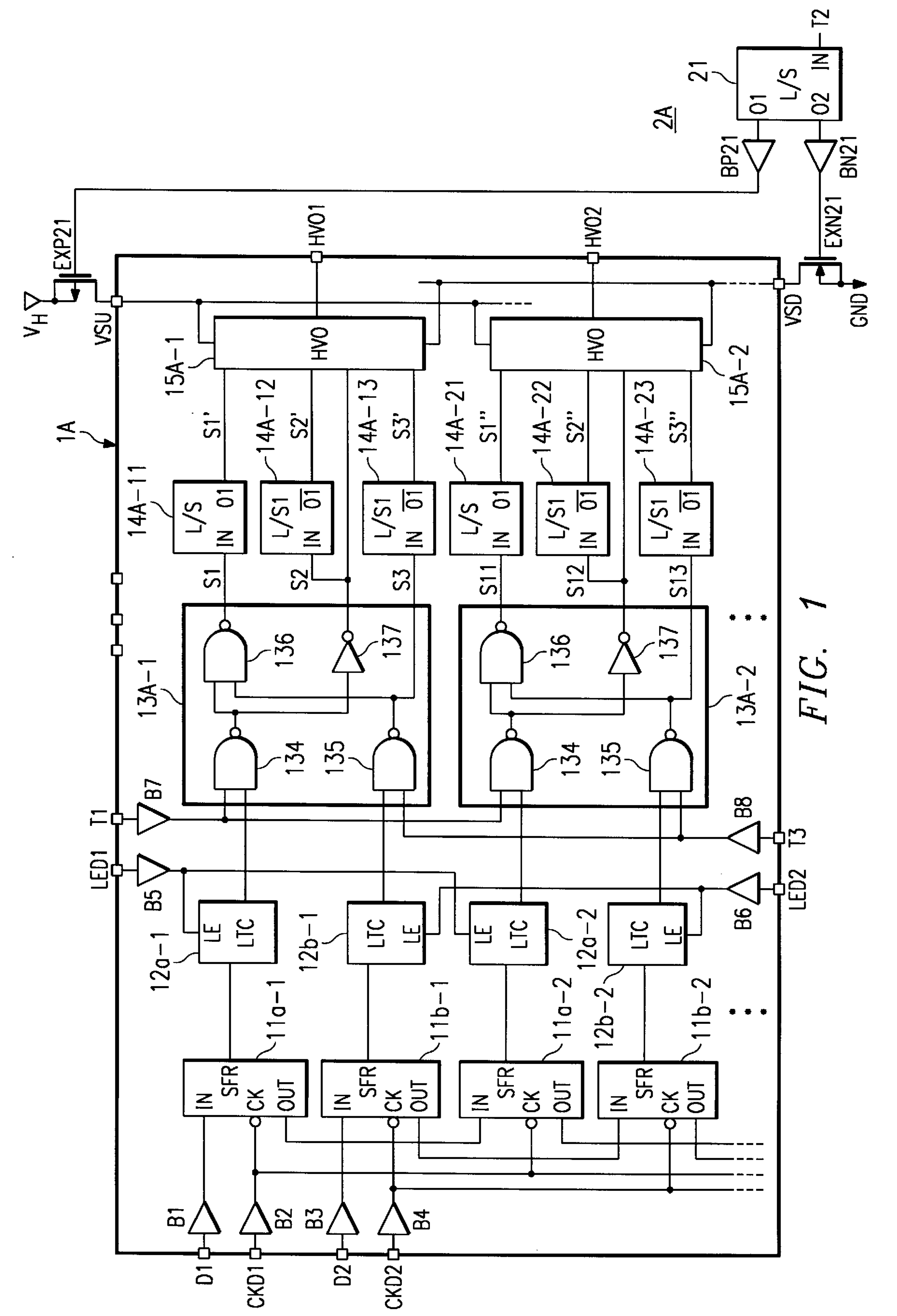
FIG. 1 shows a first embodiment of a display panel driving circuit according to my invention.
Figure 12:
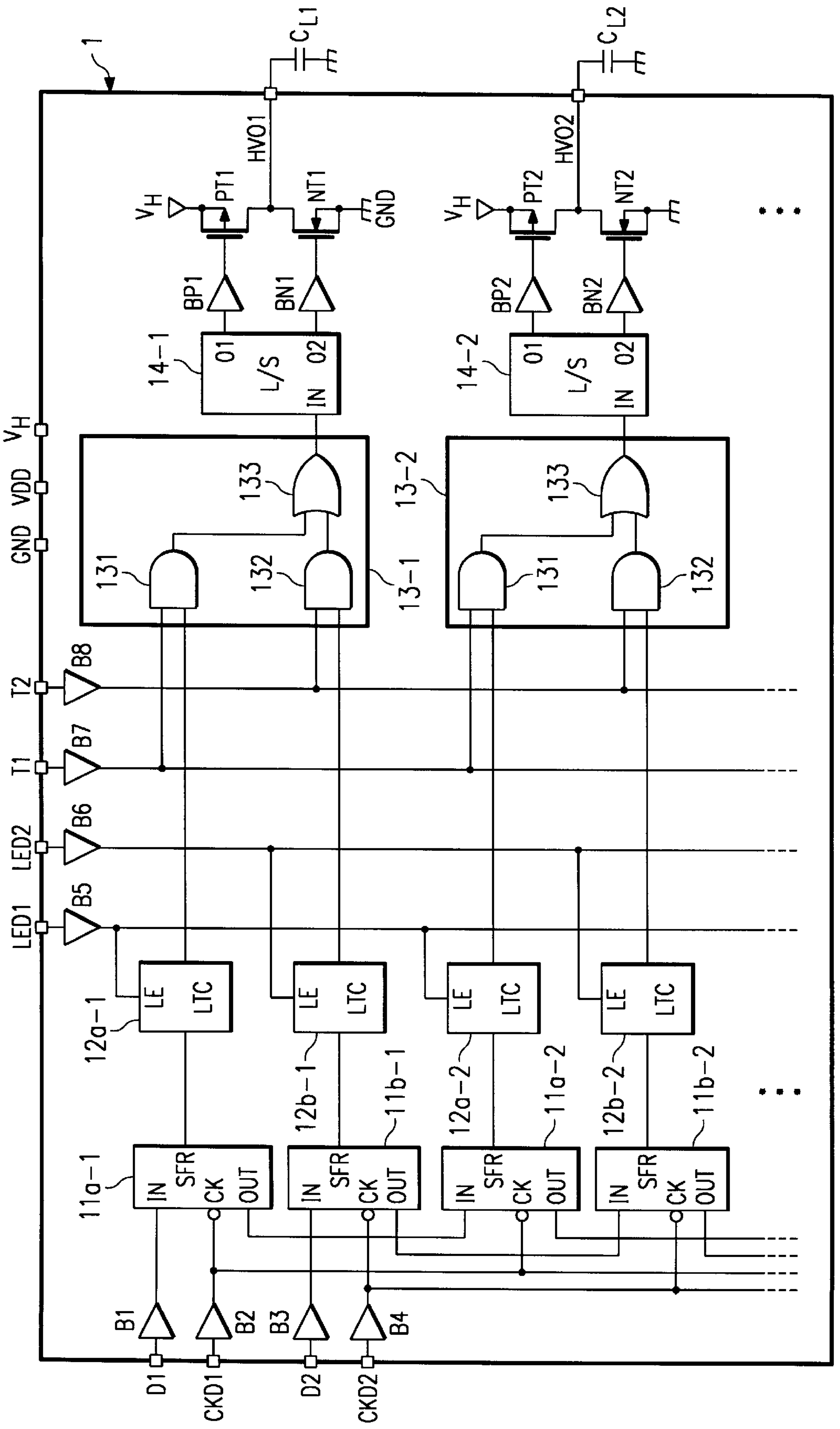
FIG. 12 shows an embodiment of a conventional display panel driving circuit.
Figure 13:
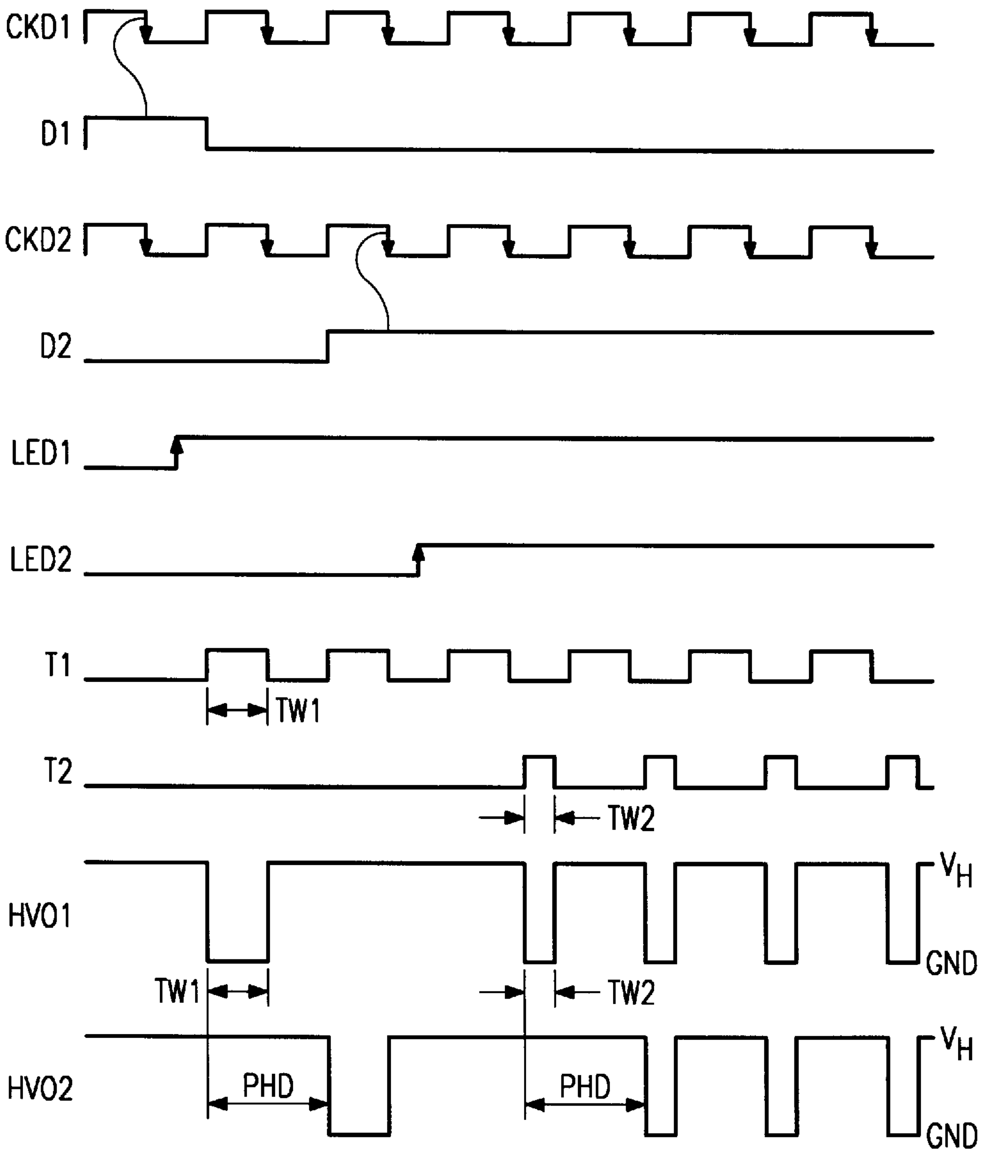
FIG. 13 is a timing chart for explaining the operation of the circuit in FIG. 12.

FIG. 1 shows a first embodiment of the display panel driving circuit according to the invention and the same constitutional parts as those in FIG. 12, which shows a conventional example, are indicated with the same reference numerals.

Namely, 1A represents the IC part, 2A the discrete part, B1–B8 the input buffer circuits, 11*a*-1, 11*a*-2, . . . , 11*b*-1, 11*b*-2, . . . the shift register circuits SFR, 12*a*-1, 12*a*-2, . . . , 12*b*-1, 12*b*-2, . . . the latch circuits LTC, 13A-1, 13A-2, . . . the gate circuits, 14A-11, 14A-21, . . . , 14A-12, 14A-22, . . . , 14A-13, 14A-23, . . . the level shift circuits, 15A-1, 15A-2, . . . the output circuits HVO, BN21 the buffer circuits, EXP21 the PMOS transistor, EXN21 the NMOS transistor, HVO1, HVO2 the output terminals, GND the ground potential, $V_{DD}$ the supply voltage, and $V_H$ the supply high voltage.

IC part 1A is comprised of input buffer circuits B1–B8, shift register circuits 11*a*-1, 11*a*-2, . . . , 11*b*-1, 11*b*-2, . . . , latch circuits 12*a*-1, 12*a*-2, . . . , 12*b*-1, 12*b*-2, . . . , gate circuits 13A-1, 13A-2, . . . , level shift circuits 14A-11, 14A-21, . . . , 14A-12, 14A22, . . . , 14A-13, 14A-23, . . . and output circuits 15A-1, 15A-2, Also, with respect to one output terminal HVO, two shift register circuits 11*a* and 11*b*, two latch circuits 12*a* and 12*b*, one gate circuit 13A, three level shift circuits 14A, and one output circuit 15A are provided.

Gate circuits 13A-1, 13A-2, . . . are comprised of three two-input NAND circuits 134–136 and one inverter 137, and signals S1–S3 are generated by carrying out logical operations on signals T1 and T3.

One input of two-input NAND circuit 134 in gate circuit 13A-1 is coupled to the input terminal of signal T1 via input buffer circuit B7, the other input is coupled to the output of latch circuit 12*a*-1, and the output is coupled to the input of inverter 137 and one input of two-input NAND circuit 136.

One input of two-input NAND circuit 135 is coupled to the input terminal of signal T3 via input buffer circuit B8, the other input is coupled to the output of latch circuit 12*b*-1, and the output is coupled to input terminal IN of level shift circuit 14A-13 and the other input of two-input NAND circuit 136.

The output of two-input NAND circuit 136 is coupled to input terminal IN of level shift circuit 14A-11 and the output of inverter 137 is coupled to one input of output circuit 15A-1 and input terminal IN of level shift circuit 14A-12.

Signal S1 is output from two-input NAND circuit 136, signal S2 from the output of inverter 137, and signal S3 from two-input NAND circuit 135.

One input of two-input NAND circuit 134 in gate circuit 13A-2 is coupled to the input terminal of signal T1 via input buffer circuit B7, the other input is coupled to the output of latch circuit 12*a*-2, and the output is coupled to one input of two-input NAND circuit 136 and the input of inverter 137.

One input of two-input NAND circuit 135 is coupled to the input terminal of signal T3 via input buffer circuit B8, the other input is coupled to the output of latch circuit 12*b*-2, and the output is coupled to the other input of two-input NAND circuit 136 and input terminal IN of level shift circuit 14A-23.

The output of two-input NAND circuit 136 is coupled to input terminal IN of level shift circuit 14A-21, and the output of inverter 137 is coupled to the input terminal of level shift circuit 14A-22 and one input of output circuit 15A-2.

Signal S11 is output from two-input NAND circuit 136, signal S12 from the output of inverter 137, and signal S13 from two-input NAND circuit 135.

Level shift circuit 14A-11 L/S outputs signal S1' at the high level from output terminal O1 to output circuit 15A-1 when signal S1 is input to input terminal IN at the high level ($V_{DD}$ level).

Level shift circuit 14A-12 L/S1 converts input signal (GND-$V_{DD}$) of a logical level into a signal of full amplification (GND-$V_H$) and outputs signal S2' of the supply high voltage $V_H$ level from inverted-output terminal O1_ to output circuit 15A-1 when signal S2 at the low level (GND level) is input to input terminal IN and outputs signal S2' at the ground GND level when signal S2 at the high level (supply voltage $V_{DD}$ level) is input to input terminal IN.

Level shift circuit 14A-13 (L/S1) converts input signal (GND-$V_{DD}$) of logical level into a signal of full amplification (GND-$V_H$) and outputs signal S3' at the supply high voltage $V_H$ level from inverted-output terminal O1_ to output circuit 15A-1 when signal S3 at the low level (GND level) is input to input terminal IN and outputs signal S3' at the ground (GND) level when signal S3 at the high level (supply voltage $V_{DD}$ level) is input to input terminal IN.

Level shift circuit 14A-21 L/S outputs signal S1" at the high level from output terminal O1 to output circuit 15A-2 when signal S11 is input at the high level ($V_{DD}$ level) to input terminal IN.

Level shift circuit 14A-22 (L/S1) converts the input signals (GND-$V_{DD}$) of a logical level into signals of full amplification (GND-$V_H$), and outputs signal S2" at the high supply voltage $V_H$ level from inverted-output terminal O1_ to output terminal 15A-2 when signal S12 at the low level (GND level) is input into input terminal IN and signal S2" at the ground GND level when signal S2 at the high level (supply voltage $V_{DD}$ level) is input into put terminal IN.

Level shift circuit 14A-23 (L/S1) converts the input signals (GND-$V_{DD}$) of logical level into signals of full amplification (GND-$V_H$), and outputs signal S3" at the high supply voltage $V_H$ level from inverted-output terminal O1_ to output circuit 15A-2 when signal S13 at the low level (GND level) is input into input terminal IN and signal S3" at the ground GND level when signal S3 at the high level (supply voltage $V_{DD}$ level) is put into input terminal IN.

FIG. 2 shows an embodiment of a level shift circuit that converts input signals of a logical level (GND-$V_{DD}$) into signals of full amplification (GND-$V_H$). In this level shift circuit, NMOS transistor MNIN, resistive elements R1 and R2, NMOS transistor MN, PMOS transistor MP, and current source Ie for a circuit that restricts the electric current between ground GND and the high voltage $V_H$ supply line and are connected in series as shown in FIG. 2. Connection node N1 of resistive elements R1 and R2 is coupled to the gate of PMOS transistor MP, input signal IN is supplied to the input of inverter INV and the gate of NMOS transistor MNIN, and the output of inverter INV is coupled to the gate of NMOS transistor MN. The level converted signal is output from connection node O1 of the drains of NMOS transistor MN and PMOS transistor MP. Each MOS transistor is a thin-film transistor, so the threshold voltage Vth is about 1–2 V.

Output circuits 15A-1 and 15A-2 have a circuit configuration like that shown in FIG. 3 and output a sustaining pulse or scanning pulse to output terminal HVO according to the input level of signals S1"–S3" and signals S2, S1'–S3'.

Output circuits 15A-1 and 15A-2 are comprised of diodes D1–D16, high-voltage diodes DH1 and DH2, high-drain-voltage thin-film-gate NMOS transistors XSU, XSD, and XSC and high-drain-voltage thin-film-gate PMOS transistor XPUL.

Diodes D1–D7 are connected in series, the anode of diode D1 is coupled to the gate of NMOS transistor XSU and connection terminal OSU, and the cathode of diode D7 is coupled to the source of NMOS transistor XSU. The anode of diode D8 is coupled to the connection node of the source of NMOS transistor XSU and cathode of diode D7, and the cathode of diode D8 is coupled to the connection node of the gate of NMOS transistor XSU and connection terminal OSU and the anode of diode D1.

The drain of NMOS transistor XSU is coupled to the cathode of high-voltage diode DH1 and the anode of high-voltage diode DH1 is coupled to connection terminal VSU to discrete part 2A.

Also, connection terminal OSU is coupled to inverted-output terminal O1_ of level shift circuit 14A-12 (-22).

Diodes D9–D15 are connected in series, the anode of diode D9 is coupled to the gate of NMOS transistor XSD and connection terminal PSD, and the cathode of diode D15 is coupled to the source of NMOS transistor XSD. The anode of high-voltage diode DH2 and diode D16 is coupled to the connection node of the source of NMOS transistor XSD and the cathode of diode D15, and the cathode of diode D16 is coupled to the connection node of the gate of NMOS transistor XSD and connection terminal PSD and the anode of diode D9.

The drain of NMOS transistor XSD is coupled to the source of NMOS transistor XSU and the cathode of high-voltage diode DH2 is coupled to connection terminal VSD to discrete part 2A.

Also, connection terminal PSD is coupled to inverted-output terminal O1_ of level shift circuit 14A-13 (-23).

The drains of PMOS transistor XPUL and NMOS transistor XSC are connected and the connection node thereof is coupled to output terminal HVO and the connection node of the drain of NMOS transistor XSD and the source of NMOS transistor XSU.

The source of PMOS transistor XPUL is coupled to the feed high supply voltage $V_H$ line, the gate is coupled to connection terminal PUL, and connection terminal PUL is coupled to output terminal O1 of level shift circuit 14-11 (-21).

The source of NMOS transistor XSC is coupled to ground line GND, the gate is coupled to connection terminal OSC, and connection terminal OSC is coupled to the output of inverter 137 of gate circuit 13A-1 (-2).

In FIG. 3, each MOS transistor is a thin-film transistor, so the threshold voltage Vth is about 1–2 V.

Also, discrete part 2A is comprised of level shift circuit (L/S) 21, buffer circuits BP21 and BN21, pull-up PMOS transistor EXP21 and pull-down NMOS transistor EXN21.

Level shift circuit (L/S) 21 has two output terminals O1 and O2 and when signal T2 at the high level is input to input terminal IN, signals at the high level approximately equal to the supply voltage of buffer circuits BP21 and BN21 are output from the output terminals O1 and O2.

The gate of PMOS transistor EXP21 is coupled to output terminal O1 of level shift circuit 21 via buffer circuit BP21, the source is coupled to the high supply voltage $V_H$ line, and the drain is coupled to connection terminal VSU of IC part 1A.

The gate of NMOS transistor EXN21 is coupled to output terminal O2 of level shift circuit 21 via buffer circuit BN21, the source is coupled to ground line GND, and the drain is coupled to connection terminal VSD of IC part 1A.

Next, the operation according to the constitution will be explained with reference to the timing chart in FIG. 4.

In this circuit, data signal D1 is data for generating a scanning pulse to be applied to the prescribed cathode line at the start of plasma discharge and data for controlling NMOS transistors XSU and XSC of output circuit 15A-1 (-2) as shown in FIG. 3.

Also, data signal D2 is data for generating a sustaining pulse to be applied to the prescribed cathode line during discharge from the second time on and data for controlling NMOS transistors XSU and XSD of output circuit 15A-1 (-2).

These data signals D1 and D2 are serial/parallel converted in shift register circuits 11*a* and 11*b* and latch circuits 12*a* and 12*b*. Namely, this data is transferred by clock signals CKD1 and CKD2 to shift register circuits 11*a* and 11*b* and then held in latch circuits 12*a* and 12*b* based on the input of signals LED1 and LED2.

Logical operations are then carried out on signals T1 and T3 and the data held in latch circuits 12*a* and 12*b* in gate circuit 13A. As a result, signals with waveforms like those indicated by S1, S2, and S3 in FIG. 4 are generated.

Signal S1 generated in gate circuit 13A-1 is input to level shift circuit 14A-11, signal S2 to level shift circuit 14A-12 and connection terminal OSC of output circuit 15A-1, and signal S3 to level shift circuit 14A-13.

Similarly, signal S1 generated in gate circuit 13A-2 is input to level shift circuit 14A-21, signal S2 to level shift circuit 14A-22 and connection terminal OSC of output circuit 15A-2, and signal S3 to level shift circuit 14A-23.

Figure 4:
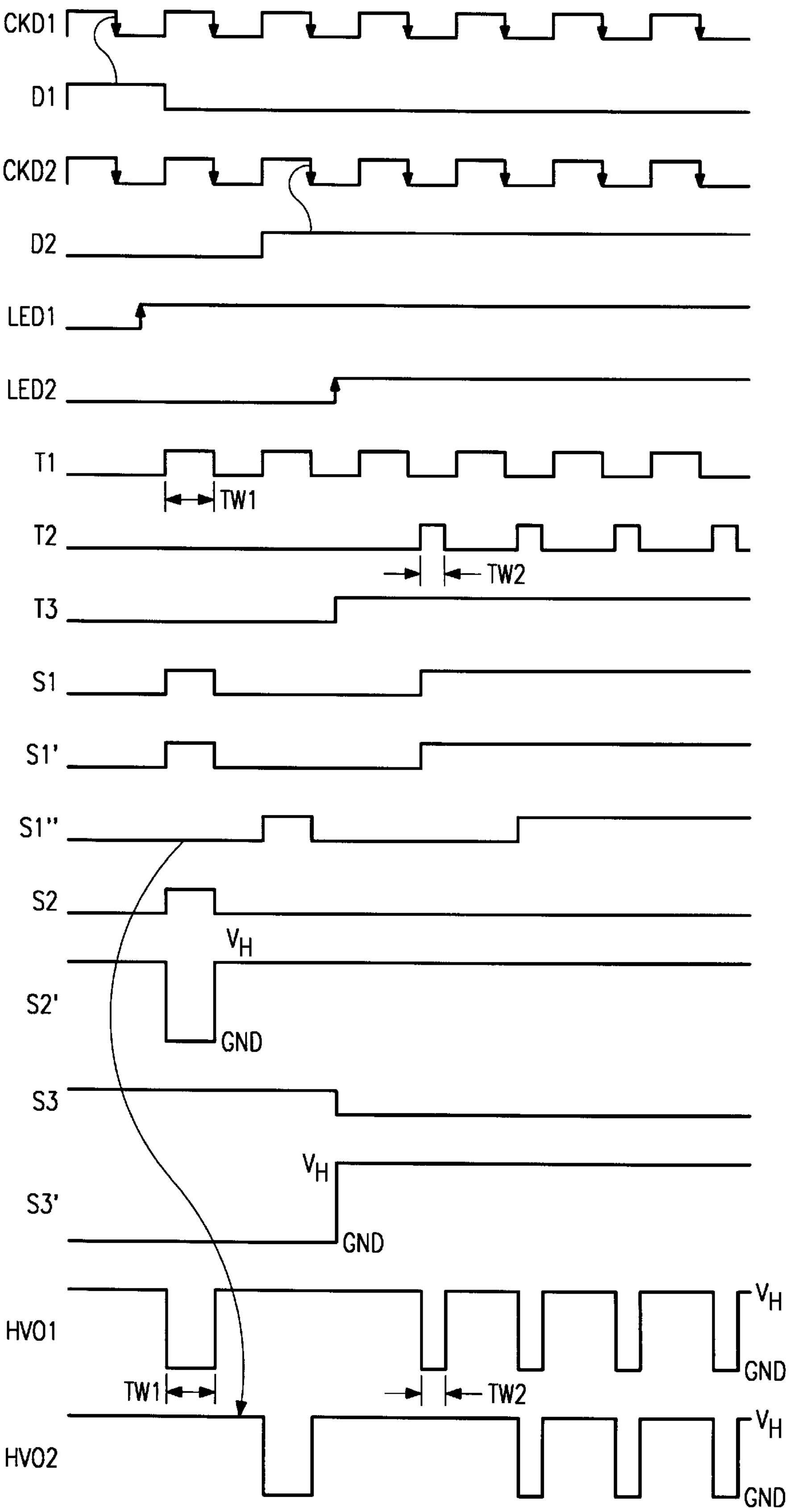
FIG. 4 is a timing chart of the operation of the circuit in FIG. 1.

In each level shift circuits 14A-11-14A-13 and 14A-21-14A-23, level conversion is carried out with respect to the input signals, a signal with a waveform like that indicated by S1' in FIG. 4 is output from level shift circuit 14A-11, a signal with a waveform like that indicated by S2' is output from level shift circuit 14A-12, and a signal with a waveform like that indicated by S3' is output from level shift circuit 14A-13 respectively to connection terminals PUL, OSU, and PSD of output circuit 15A-1.

Similarly, a signal with a waveform like that indicated by S1" in FIG. 4 is output from level shift circuit 14A-21, signal S2" similar to signal S2' is output from level shift circuit 14A-22, and signal S3" similar to signal S3' is output from level shift circuit 14A-23 respectively to connection terminals PUL, OSU, and PSD of output circuit 15A-2 with a prescribed phase difference from signals S1'–S3'.

In this case, if data signal D1 is at the high level and data signal D2 is at the low level, signal S1, signal S2, and signal S3 go to the high level at the high level timing of signal T1. As a result, signal S1', is input to output circuit 15A-1 at the high level of the high supply voltage $V_H$ and signal S2' and signal S3' at the low level of the ground level.

Consequently, NMOS transistor XSC composing a so-called totem pole circuit is held in the on state, NMOS transistor XSU is held in the off state, and NMOS transistor XSD and PMOS transistor XPUL are also held in the off state in output circuit 15A-1.

As a result, output terminal HVO is pulled down to the ground level and a scanning pulse is generated.

This scanning pulse is output with a fixed phase difference since data signal D1 is transmitted in shift register circuit 11*a*.

Also, which output terminal HVO to be used is determined by data signal D2 in accordance with the output of the sustaining pulse.

Namely, when data signal D2 is at the high level (at which time data signal D1 is at the low level), signal S3 switches to the low level at the high level timing of signal T3. At this time, signal S1 switches to the high level and signal S2 is at the low level.

As a result, signal S1' is input at the high level and signals S2' and S3' at the high supply voltage $V_H$ level are respectively input to connection terminals PUL, OSU, and PSD of output circuit 15A-1.

Consequently, NMOS transistors XSC and XPUL are held in the off state and NMOS transistors XSU and XSD are held in the on state in output circuit 15A-1.

Then, PMOS transistor EXP21 and NMOS transistor EXN21 of discrete part 2A are alternately turned on/off according to the input of signal T2 to level shift circuit 21 and a sustaining pulse is selectively output.

Even data signal D2 is output to output terminal HVO in the shift register circuit with a fixed phase difference in the same manner as data signal D1 of a scanning pulse.

Also, when output terminal HVO1 is carrying out the scanning operation, output terminal HVO2 is drawn to output terminal HVO1 due to the capacitance between output terminals HVO1 and HVO2, which is prevented by maintaining PMOS transistor XPUL in the on state at a timing other than the sustaining pulse timing T3 and scanning pulse time T1.

As noted above, during the sustaining pulse input, the operation is carried out such that PMOS transistor XPUL and NMOS transistor XSC of output circuit 15A are maintained in the off state and NMOS transistors XSU and XSD are constantly maintained in the on state.

At this time, signals S2' and S3' at the high supply voltage $V_H$ level, which are outputs from level shift circuits 14A-12 and 14A-13, are applied to connection terminals OSU and OSC, which are connected to the gates of NMOS transistors XSU and XSD.

As a result, a forward current flows in diodes D1–D7 and D9–D15 and gate/source voltage VGS of NMOS transistors XSU and XSD is always maintained around 5 V.

Consequently, if, for example, output terminal HVO1 is presently at the low level, externally appended PMOS transistor EXP21 is maintained in the on state, and connection terminal VSU is pulled up to high supply voltage VH, output terminal HVO1 is pulled up to approximately [$V_H - V_{TN} - \alpha$] while the source, drain, and gate of NMOS transistor XSU maintain approximately the same potential difference since NMOS transistor XSU is always in the on state, where $V_{TN}$ is the threshold voltage of the NMOS transistor and $\alpha$ is the on voltage of the level shift circuit.

At this time, externally appended NMOS transistor EXN21 is in the off state, so the level of the drain, gate, and source of NMOS transistor XSD is also pulled up in the same manner as output terminal HVO1.

In this case, the power consumption of discrete part 2A and the power consumption of IC part 1A during pull up with respect to the capacitive load of output terminal HVO can ideally be expressed with the following equation in FIG. 3:

$$\tfrac{1}{2}C_L \cdot V_H^2 = (I_2 \times V_{DIODE} + I_1 \times \Delta V_{DS(XSU)} \times I_1 \times V_{DH1}) + I_1 \times \Delta V_{DS(EXP21)} \quad (3)$$

where $V_{DIODE}$ indicates the forward voltage of diodes D1–D7 and is about 5 V, $\Delta V_{DS(XSU)}$ indicates the drain/source voltage of NMOS transistor XSU, $V_{DH1}$ indicates the forward voltage of high-voltage diode DH1 and is about 0.7

V, and $\Delta V_{DS(EXP21)}$ indicates the drain/source voltage during the switching of PMOS transistor EXP21 of discrete part 2A.

As can be seen from the equation (3), the ratio of the power consumption of IC part 1A and discrete part 2A is determined by drain/source voltage $V_{DS(ESP21)}$ during the switching of PMOS transistor EXP21 and drain/source voltage $V_{DS(XSU)}$ of NMOS transistor XSU.

Figure 5:
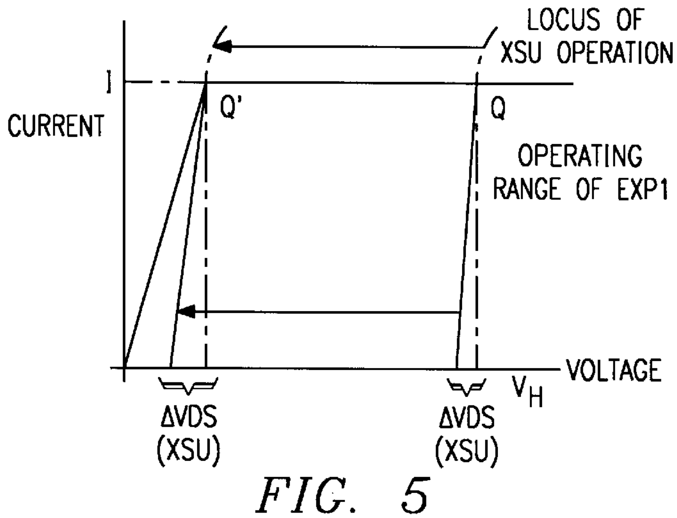
FIG. 5 is a graph of the operation and effect during generation of a sustaining pulse in the circuit of FIG. 1.

In this case, when the elemental performance of NMOS transistor XSU is designed to be more favorable than the elemental performance of PMOS transistor EXP21, NMOS transistor XSU always operates in the nonsaturated area as indicated in FIG. 5 and PMOS transistor EXP21 can always be operated by the reciprocation of the saturated area and the nonsaturated area. Namely, the operating characteristic of NMOS transistor XSU changes from left to right as shown in FIG. 5 according to the drain potential.

Consequently, it is possible to satisfy the relationship indicated in the following equation:

$$\Delta V_{DS(XSU)} \leqq \Delta V_{DS(EXP21)} \quad (4)$$

Similarly, when pull down is considered and the elemental performance of NMOS transistor XSD is designed to be more favorable than the elemental performance of NMOS transistor EXN21, NMOS transistor XSD always operates in the nonsaturated area and NMOS transistor EXN21 can always operate by the reciprocation of the saturated area and the nonsaturated area. Therefore, it is possible to satisfy the relationship indicated in the following equation:

$$\Delta V_{DS(XSD)} \leqq \Delta V_{DS(EXN21)} \quad (5)$$

In this case, $\Delta V_{DS(XSD)}$ indicates the drain/source voltage of NMOS transistor XSD and $\Delta V_{DS(EXN21)}$ indicates the drain/source voltage during the switching of NMOS transistor EXN21.

Namely, by dividing absolute power consumption $[CV^2 \cdot f]$ by about 2:8 with the ratio of $\Delta V_{DS(XSU)}$ and $\Delta V_{DS(EXP21)}$ and $\Delta V_{DS(XSD)}$ and $\Delta V_{DS(EXN21)}$, it is possible to make the power consumed by driver IC to be about 2 W, which is 20% of 9.6 W in the conventional circuit.

Also, it is possible to output the sustaining pulse at a fixed phase difference with respect to each output terminal HVO since floating NMOS transistor XSU and XSD elements are provided.

As explained above, according to the embodiment, the constitution of the display panel driving circuit was composed with monolithic IC part 1A and discrete part 2A to divide the power consumption; thus, it is possible to keep the power consumption in the IC part low at about 2 W, which is the restriction of the package, etc.

Also, floating state NMOS transistor XSU and XSD elements are provided with respect to each output terminal HVO, so it is possible to output a sustaining pulse with a fixed phase difference.

In the aforementioned embodiment, a driving circuit for a cathode electrode was explained, but the embodiment can be easily applied to a driving circuit for an anode electrode. Namely, by making signal D1 a picture data signal and by fixing signal D2 to the GND level, it is possible to apply the embodiment to a driving circuit for an anode and also reduce the power consumption in the IC part.

Figure 6:
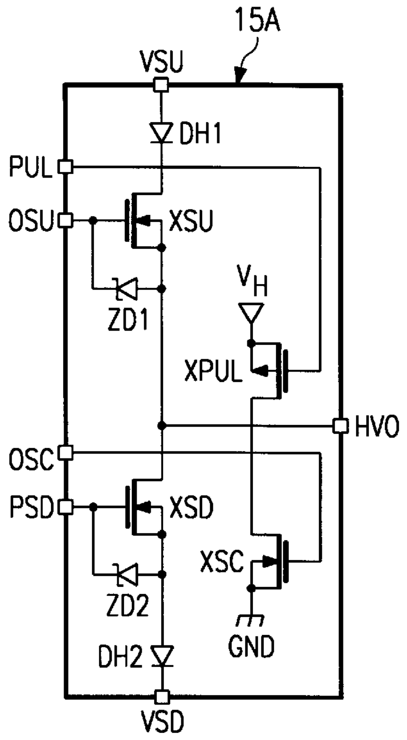
FIG. 6 shows another embodiment of an output circuit according to my invention.

FIG. 6 shows another embodiment of an output circuit according to my invention.

This circuit differs from the circuit in FIG. 3 in that zener diodes ZD1 and ZD2 were used instead of diodes D1–D8 and diodes D9–D16 in the circuit shown in FIG. 3.

The remainder of the constitution is the same as FIG. 3 and the same functional effects as in the circuit of FIG. 3 can be obtained.

Figure 7:
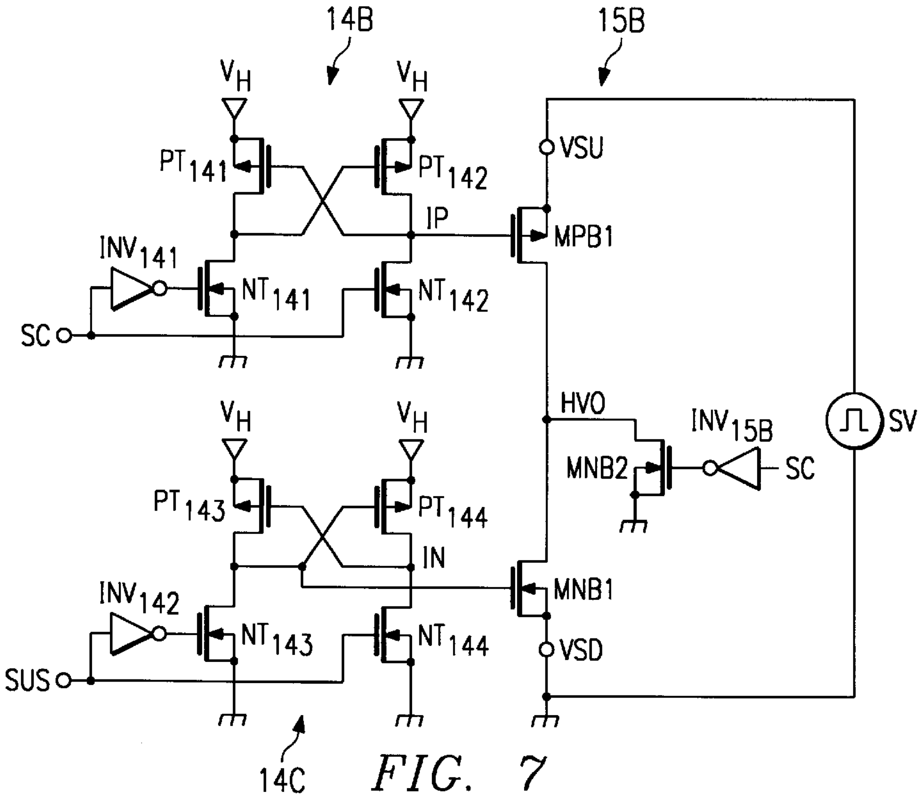
FIG. 7 shows another embodiment of a level shift circuit and output circuit according to my invention.

FIG. 7 shows another embodiment of an output circuit and level shift circuit of an output circuit according to my invention. In FIG. 7, 14B and 14C represent the level shift circuits and 15B represents the output circuit.

Level shift circuit 14B is comprised of PMOS transistor $PT_{141}$, NMOS transistor $NT_{141}$, PMOS transistor $PT_{142}$, NMOS transistor $NT_{142}$, and inverter $INV_{141}$. Signal SC is supplied to the gate of NMOS transistor $NT_{142}$ and the gate of NMOS transistor $NT_{141}$ via inverter $INV_{141}$.

Similarly, level shift circuit 14C is comprised of PMOS transistor $PT_{143}$, NMOS transistor $NT_{143}$, PMOS transistor $PT_{144}$, NMOS transistor $NT_{144}$, and inverter $INV_{142}$. Signal SUS is supplied to the gate of NMOS transistor $NT_{144}$ and the gate of NMOS transistor $NT_{143}$ via inverter $INV_{142}$.

Also, output circuit 15B is comprised of PMOS transistor MPB1 and NMOS transistor MHB1, which are connected in series between connection terminal VSU and connection terminal VSD, NMOS transistor MNB2, which is coupled between the ground line and output terminal HVO composed of the connection node of the transistors, and inverter $INV_{15B}$, which supplies signal SC to the gate of NMOS transistor MNB2 by level inverting.

In this circuit, PMOS transistors $PT_{141}$, and $PT_{142}$ of level shift circuit 14B, PMOS transistors $PT_{143}$ and $PT_{144}$ of level shift circuit 14C, and PMOS transistor MPB1 and NMOS transistor MNB1 of output circuit 15B are composed of high-voltage thick-film-gate MOS transistors.

Signals according to signal source SV are input to connection terminal VSU and connection terminal VSD.

In this type of constitution, connection terminal VSD is given a potential that is pulled down from gate input IN by the amount of threshold voltage $V_T$ of NMOS transistor MNB1 when connection terminal VSU is pulled up.

Similarly, connection terminal VSU is given a potential that is pulled up from gate input IP by the amount of threshold voltage $V_T$ of MPB1 during pull down.

Consequently, the change in drain/source voltage $V_{DS}$ of NMOS transistor MNB1 and PMOS transistor MPB1 exceeds that in the circuit shown in FIGS. 1 and 3.

This is due to the fact that the threshold voltage of the thick-film-gate MOS transistor is greater than the threshold voltage of the thin-film-gate MOS transistor. Also, the layout area becomes larger.

However, level shift circuits 14B and 14C are so-called latch types so a reduction in the power consumption is possible.

FIG. 8 shows a second embodiment of a display panel driving circuit according to my invention. This device has an IC part 1B and discrete part 2B. The scanning (write) and sustaining operations can be switched with an externally appended element of discrete part 2B.

IC part 1B has gate circuit G (n=1, 2, . . . ), level shift circuit LS (n), clamping diode DP (n), output terminal separating diodes DH (n1), DH (n2), NMOS transistor MN (n) composing the driving circuit, and gate protecting zener diode ZD (n) of the NMOS transistor MN with respect to one output terminal HVO.

Input of gate circuit G (n) is coupled to the input line of scanning signal SCAN (n) and sustaining signal SUS (n) and the output is coupled to input terminal IN of level shift circuit LS (n).

Level shift circuit LS (n) has one output terminal O1 and when a high-level signal is input to input terminal IN, a signal at the high supply voltage $V_H$ level is output so that NMOS transistor MN (n) composing the driving circuit is turned on sufficiently from output terminal O1. Also, when a low-level signal is input to input terminal IN, a ground-level signal is output so that NMOS transistor MN (n) is turned off sufficiently from output terminal O1. Level shift circuit LS (n) has a circuit similar to the constitution shown in FIG. 2.

Output terminal O1 of level shift circuit LS (n) is coupled to the cathode of zener diode ZD (n) and the gate of NMOS transistor MN (n), the source of NMOS transistor MN (n) is coupled to the anode of output terminal separating diode DH (n2) and the anode of zener diode ZD (n), and the cathode of output terminal separating diode DH (n2) is coupled to connection terminal VSD of IC part 1B and discrete part 2B.

The drain of NMOS transistor MN (n) is coupled to the cathode of output terminal separating diode DH (n1) and the anode of clamping diode DP (n) and is also connected to high-voltage output terminal HVO (n).

Also, the cathode of clamping diode DP (n) is coupled to the high supply voltage $V_H$ line, and the anode of output terminal separating diode DH (n1) is coupled to connection terminal VSU of IC part 1B and discrete part 2B.

Discrete part 2B is comprised of pull-up PMOS transistor EXP22 and pull-down NMOS transistor EXN22.

The source of pull-up PMOS transistor EXP22 is coupled to the high supply voltage $V_H$ line, the drain is coupled to the connection terminal VSU, and the gate is coupled to the signal input line SUIN.

The source of pull-down NMOS transistor EXN22 is coupled to the ground line, the drain is coupled to connection terminal VSD, and the gate is coupled to the signal input line SCIN.

FIG. 9 is a timing chart showing the relationship between the level of output terminal HVO (n) and each of the input driving signals SCAN (n), SUS (n), SUIN, and SCIN in the circuit of FIG. 8.

Signal SCAN (n) is a signal which shifted the phase of signal SCAN (1) by 4(n−1) μsec and is generally a signal for controlling the write operation timing when driving the plasma display.

Signal SUS (n) is a signal which shifted the phase of signal SUS (1) by 4(n−1) μsec and is generally a signal which controls the sustaining timing when driving the plasma display.

Also, signal SCIN is a signal for executing the write operation and signal SUIN is a signal for executing the sustaining operation in the IC of discrete part 2B, namely, pull-down NMOS transistor EXN22 and pull-up PMOS transistor EXP22.

Signals SCAN (n) and SUS (n) are signals for controlling which output terminal HVO (n) to output the write/sustain states executed by the operation of pull-down NMOS transistor EXN22 and pull-up PMOS transistor EXP22 with the on/off switching operation of NMOS transistor MN (n) as a driving circuit. Namely, NMOS transistor NM (n) is controlled so that the output of pull-down NMOS transistor EXN22 is transmitted to output terminal HVO (n).

Also, the timing is realized by operating pull-down NMOS transistor EXN22 after NMOS transistor MN (n) is switched to the on state with signals SCAN (n) and SUS (n).

Next, the operation of the circuit in FIG. 8 will be explained.

In this circuit, one driving circuit is driven with signals SUS (n) and SCAN (n) and with signals SUIN and SCIN input commonly to all driving circuits, signal SUS (n) is a signal which shifted signal SUS (1) by t(n−1) μsec, and signal SCAN (n) is a signal which shifted signal SCAN (1) by t(n−1) μsec. In this case, t is a constant.

First of all, the logic operation is carried out when signals SUS (n) and SCAN (n) go to the high level in gate circuit G (n), and the cathode of zener diode ZD (n) and the gate of NMOS transistor MN (n) as the driving circuit go to the high level via level shift circuit LS (n).

Consequently, zener diode ZD (n) is reverse biased, gate/source voltage $V_{GS}$ of NMOS transistor MN (n) is secured by zener voltage, and NMOS transistor MN (n) enters the on state.

In this state, high-level signal SUIN is supplied to the gate of pull-up PMOS transistor EXP22 of discrete part 2B and high-level signal SCIN is supplied to the gate of pull-down NMOS transistor EXN22 of discrete part 2B. As a result, pull-up PMOS transistor EXP22 enters on the off state and pull-down NMOS transistor EXN22 enters the on state.

Zener diode ZD (n) is constantly supplied with a constant current from output terminal O1 of level shift circuit LS (n), so NMOS transistor MN (n) is pulled down to the ground level by pull-down NMOS transistor EXN22 while constantly maintaining the off state and the gate, source, and drain of NMOS transistor MN (n) maintaining approximately the same potential difference, and the level of output terminal HVO (n) finally goes to the ground level. At this time, the gate/source voltage of NMOS transistor MN (n) is about 5 V, the source/drain voltage is about 0 V, and the gate/drain voltage is about 5 V.

Namely, signals SUS (n) and SCAN (n) are input so that output terminal O1 of level shift circuit LS (n) goes to the high level before to pull-down NMOS transistor EXN22 enter the on state. Namely, NMOS transistor MN (n) functions as a switch which enters the on state before pull-down NMOS transistor EXN22 enters the on state.

On the contrary, when both signals SUS (n) and SCAN (n) are at the low-level, a-low level signal is output from output terminal O1 of level shift circuit LS (n) and NMOS transistor MN (n) enters the off state.

In this state, low-level signal SUIN is supplied to the gate of pull-up PMOS transistor EXP22 in discrete part 2B and similarly low-level signal SCIN is supplied to pull-down NMOS transistor EXN22 in discrete part 2B. As a result, pull-up PMOS transistor EXP22 enters the on state and pull-down NMOS transistor EXN22 enters the off state.

Consequently, output terminal HVO (n) goes to the a high level.

The period during which pull-up PMOS transistor EXP22 and pull-down NMOS transistor EXN22 enter the on state is controlled by making signals SUS (n) and SCAN (n) complementary to the extent that current does not flow.

Next, the operation of output terminal separating diode DH (n1) will be explained.

If presently, output terminals HVO (n) and HVO (n+1) are at the high level and in the next instant NMOS transistor MN (n) enters the on state, NMOS transistor MN (n+1) enters the off state, pull-down NMOS transistor EXN22 enters the on state, and pull-up PMOS transistor EXP22 enters the off state, output terminal HVO (n) goes to the low-level due to NMOS transistor MN (n) being in the on state.

Also, output terminal separating diode DH (n1) is biased in the forward direction by maintaining terminal VSU at the high level by the floating capacitance and connection terminal VSU goes to the low level.

At this time, output terminal separating diode DH (n+1) can be maintained at the high level by being reverse biased due to NMOS transistor MN (n+1) being in the off state and output terminal HVO (n+1) being maintained at the high level by the floating capacitance.

Consequently, it is possible to selectively place each output terminal HVO (n) in the write or sustaining state.

Next, power consumption of pull-down NMOS transistor EXN22 of discrete part 2B and IC part 1B during the write operation will be considered in the circuit of FIG. 8.

Presently, if load capacitance CL exists in output terminal HVO (n) and it is sufficiently charged to high supply voltage $V_H$, the energy of the load capacitance can be determined using the following equation.

$$P=\frac{1}{2}\cdot C_L\cdot V_H^2(W) \qquad (6)$$

Also, if the current running in NMOS transistor MN (n) of FIG. 8 is $I_{HVO}$ during discharge of the load capacitance $C_L$, it can be represented using the following equation.

$$P=I_{HVO}\times\Delta V_{DS(MN(n))}+I_{HVO}\times\Delta V_{DS(EXN)} \qquad (7)$$

In this case, current Ie flowing in zener diode ZD (n) must be low enough with respect to $I_{HVO}$.

As can be seen from the aforementioned equation (7), the power consumption in IC part 1B and discrete part 2B is obtained by dividing the value obtained for equation (6) into $\Delta V_{DS(M(n))}$ and $\Delta V_{DS(EXN)}$.

In this case, operating factors of NMOS transistor MN (n) and pull-down NMOS transistor EXN22 will be considered.

As the operating condition, let us assume that NMOS transistor MN (n) is in the on state before pull-down NMOS transistor EXN22 enters the on state.

Figure 10:
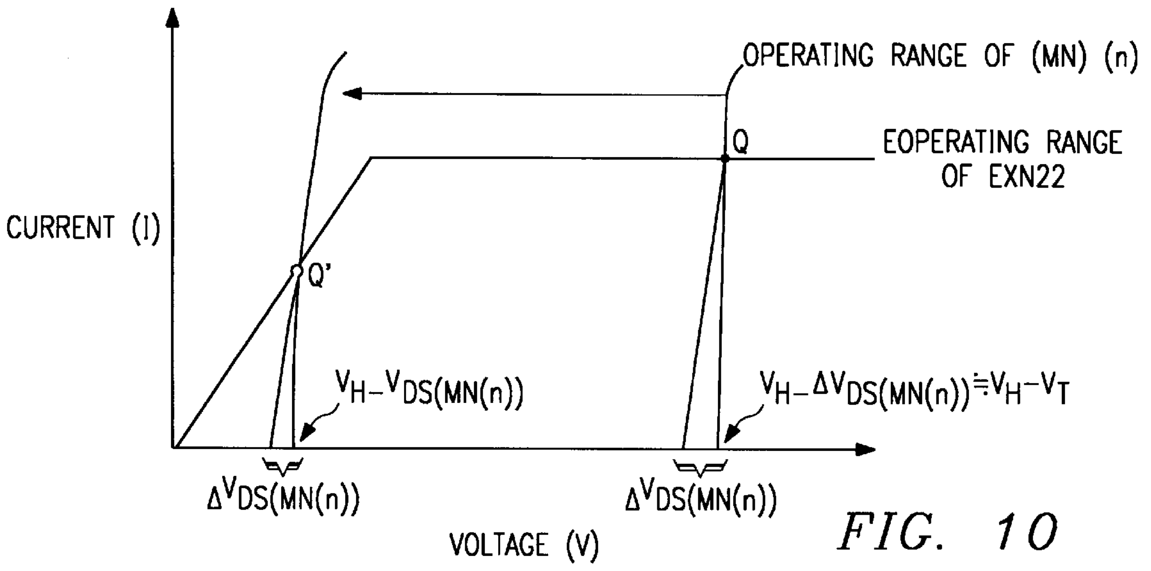
FIG. 10 is a fig. explaining the operation and effect during the generation of a sustaining pulse in the circuit of FIG. 8.

Also, if the performance of NMOS transistor MN (n) is designed more favorably than pull-down NMOS transistor EXN22, the operating range approaches that indicated in FIG. 10. In this case, a drop in forward voltage in diode DH (n2) is ignored.

At point Q in FIG. 10, NMOS transistor MN (n) is in the on state, pull-down NMOS transistor EXN22 is in the on state, and is expressed as, $$\Delta V_{DS(MN(n))}\leqq V_T \text{ } (V_T\text{: threshold value of MN (n))}$$

and also as, $$\Delta V_{DS(EXN)}\leqq V_H-V_T$$

Also, at point Q', pull-down NMOS transistor EXN22 is operated, high-voltage output terminal HVO (n) is pulled down to the ground level, and NMOS transistor MN (n) is pulled toward the ground level by pull-down NMOS transistor EXN22 while the gate, source, and drain terminals maintain approximately the same potential ($V_{GS}=V_z$, $V_{DS}=$ on voltage) so the so-called characteristic curve IV moves in parallel as shown in FIG. 10. As a result, $\Delta V_{DS(MN(n))}\leqq 5$ V can be realized ideally according to the design.

Also, pull-down NMOS transistor EXN22 becomes $$\Delta V_{DS(EXN)}=V_H-V_{DS(MN(n))}=V_H-5\text{ V} \qquad (8)$$

since the point moves along characteristic curve I–V shown in FIG. 10. Namely, NMOS transistor MN (n) is operated in the linear area and pull-down NMOS transistor EXN22 is operated by reciprocation of saturated area → linear area.

Therefore, energy $P=\frac{1}{2}C_L\cdot V_H^2$ of load capacitance $C_L$ is ideally divided as follows between driver IC part 1B and discrete part 2B:

$$\text{P driver IC:P discrete}=5:V_H-5 \qquad (9)$$

In actuality, it is difficult to make the performance of NMOS transistor MN (n) more favorable than the performance of pull-down NMOS transistor EXN22 due to the area of driver IC.

In my invention, only one pull-down element of NMOS transistor EXN22 is necessary for high-voltage output terminals HVO1–HVO64, namely, NMOS transistors MN1–MN64 and if a number of NMOS transistors shown in FIG. 8 are in the on state, namely, output terminals HVO1-HVO (n) (n=2 . . . 64) simultaneously output a high-voltage output simultaneously, it enters the state expressed by equation (9) and the power consumption in driver IC part 1B can be kept low.

For example, fabrication of an IC was conventionally difficult with 32 HVO output terminals at $V_H$=100 V, $C_L$=120 pF, $F_{HVO}$=250 kHz due to a power consumption P=9.6 W, but by designing in such that $\Delta V_{DS(MN(n))}:\Delta V_{DS(EXN)}$=2:8, it is possible to lower the power consumption in driver IC part 1B to about 2 W and the fabrication of an IC becomes easy.

Also, the driver step circuit of IC part 1B can be made smaller than the conventional technology, so 64 HVO output terminals can be used and if the power countermeasure of IC part 1B is sufficient, for example, if there is a heat loss of about 4 W in the package+Fin, etc., driving with an IC can be done by designing it such that $\Delta V_{DS(MN(n))}$: $\Delta V_{DS(EXN)}$ =2:8 with $V_H$=100 V, $C_L$=120 pF, $F_{HVO}$=250 kHz and 64 HVO.

As noted above, according to the second embodiment, it is possible to make the circuit configuration of the driver IC part simple and increase the integration of the IC since the display device was composed of a driver IC (monolithic) and a discrete IC and the power was divided.

Figure 11:
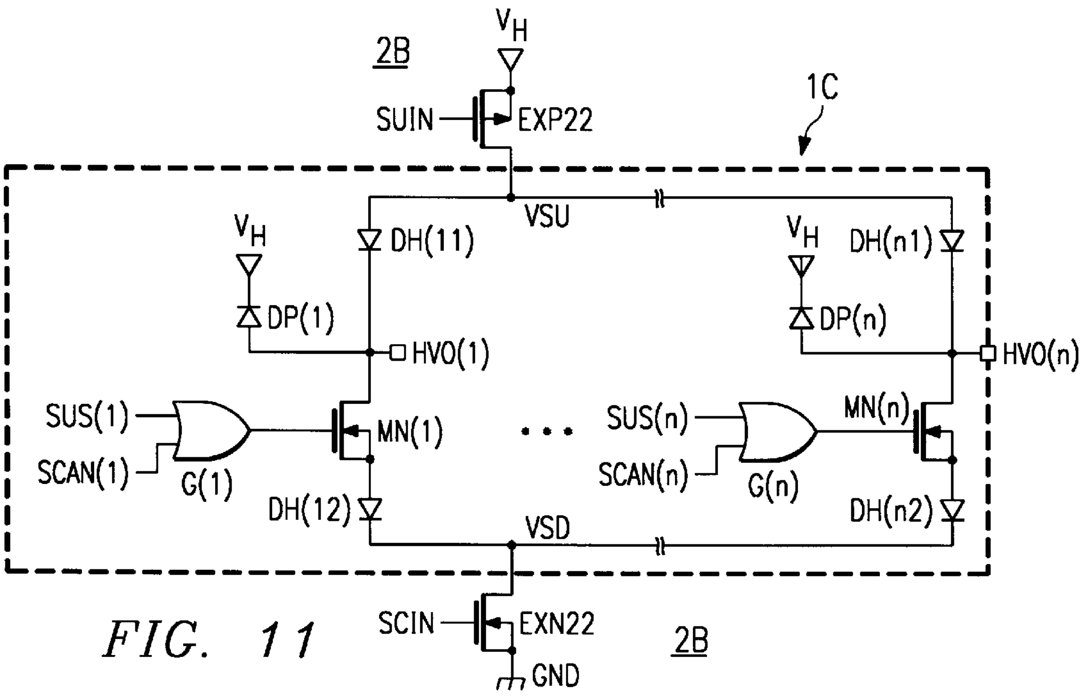
FIG. 11 is a circuit configuration explaining a modified example of the circuit in FIG. 8.

In the constitution of FIG. 8, a case in which level shift circuit LS (n) was provided was explained, but a constitution can be realized to directly input the output of gate (n) into the gate of NMOS transistor MN (n) as the driver circuit, since the output of gate (n) is an amplification of 0 V to 5 V as shown in FIG. 11.

Also, by composing NMOS transistor MN (n) as the driver circuit with a high-gate-voltage thick-film element, it is possible to minimize the current of level shift circuit LS (n).

Furthermore, by connecting the resistive elements in parallel with zener diode ZD (n), it is possible to prevent erroneous operation, such as when connection terminal VSD takes on the floating state, etc.

As explained above, according to my invention, a reduction in the power consumption can be achieved and an IC can be realized. Also, the second pulse signal can be output with a fixed phase difference.

We claim:

1. A driving circuit for a display panel having a plurality of scan lines comprising:

- inputs for a first (Vh) and second (GND) reference potentials, first (Si) and second (S2) clock signals and first and second pulse signals;
- first and second terminals;
- a first external transistor (EXP21) that couples the second terminal to the first reference potential according to a third pulse signal;
- a second external transistor (EXN21) that couples the first terminal to the second reference potential by operating in a complementary manner with respect to the first transistor; each scan line driver comprising:
- an output terminal (CL);
- a first shift register that successively shifts the first pulse signal according to the first clock signal;

a second shift register that successively shifts the second pulse signal according to the second clock signal;

a first transistor (XPUL) that couples the output terminal to the first reference potential based on the output of each register;

a second transistor (XSd) that couples the output terminal to the first terminal by operating in a complementary manner with respect to each first transistor; and a third transistor (XSC) that couples the output terminal to the second reference based on the output of the second shift register.

2. The driving circuit of claim 1 further comprising a fourth transistor that couples the output terminal to the second reference potential at least when the third transistor and the first transistor are in a nonconductive state.

3. The driving circuit of claim 2 wherein the output terminal is coupled to a cathode electrode of a plasma display panel, a scanning pulse with a prescribed phase difference is applied to the cathode electrodes according to the conduction of each first transistor, and a sustaining pulse with a prescribed phase difference is applied to the cathode electrodes with the conduction of the second transistor.

4. The driving circuit of claim 2 wherein the first shift register, second shift register, the first transistor, second transistor, third transistor, and fourth transistor are formed in a single semiconductor integrated circuit device.

5. A display panel driving circuit comprising:

an output terminal group;

a transistor group with a number of transistors which couple each output terminal of the output terminal group respectively to a second terminal based on the input of a first pulse signal;

a second transistor that couples the second terminal to the first reference potential according to a second pulse signal; and a second transistor that couples the first terminal to the second reference potential by operating in a complementary manner with respect to the first transistor; and when the transistors in the transistor group are in the conductive state,, the first transistor is maintained in the conductive state and when the transistors in the pertinent transistor group are in the nonconductive state, the second transistor is maintained in the conductive state.

6. The driving circuit of claim 5 wherein a rectifying element is coupled respectively between each output terminal of the output terminal group and the first terminal so as to be in the forward direction from the pertinent first terminal toward each output terminal.

* * * * *